United States Patent
Conniff et al.

[15] 3,641,644
[45] Feb. 15, 1972

[54] CENTRIFUGAL BLOWER WHEEL METHOD OF MAKING

[72] Inventors: Jay P. Conniff, Campbell County, Va.; Vincent N. Delaney, New Hartford; Kenneth A. Merz, Cornwall Bridge, both of Conn.

[73] Assignee: Torin Corporation, Tarrington, Conn.

[22] Filed: Aug. 21, 1969

[21] Appl. No.: 863,739

Related U.S. Application Data

[63] Continuation-in-part of Ser. No. 679,112, Oct. 30, 1967, abandoned.

[52] U.S. Cl. ..............29/156.8 CF, 230/134, 29/156.8 B, 29/156.8 R
[51] Int. Cl. ............B21k 3/04, B23p 15/02, B23p 15/04
[58] Field of Search ..............29/156.4, 156.8 CF, 156.8 B, 29/156.8 R; 230/134

[56] References Cited

UNITED STATES PATENTS

| | | | |
|---|---|---|---|
| 2,115,367 | 4/1938 | Levy et al. | 29/156.8 CF |
| 2,125,697 | 8/1938 | Swingle et al. | 29/156.8 CF |
| 2,155,264 | 4/1939 | Freed | 29/156.8 CF |
| 2,293,512 | 8/1942 | Levy | 29/156.8 CF |
| 2,895,666 | 7/1959 | Girdwood et al. | 29/156.8 CF |
| 2,915,240 | 12/1959 | Kochevar et al. | 29/156.8 CF |
| 2,991,004 | 7/1961 | Denbo et al. | 29/156.8 |
| 3,199,179 | 8/1965 | Laing | 29/156.8 CF |
| 3,211,364 | 10/1965 | Wentling et al. | 29/156.8 CF |
| 3,228,591 | 1/1966 | Goettl et al. | 29/156.8 CF |

Primary Examiner—John F. Campbell
Assistant Examiner—Donald P. Rooney
Attorney—McCormick, Paulding & Huber

[57] ABSTRACT

In a centrifugal blower wheel construction a circumaxially spaced series of axially elongated fluid-moving blades each received in an associated recess in a radially disposed support member are secured in assembly therewith by a thin annular band the interblade portions of which are simultaneously deformed.

8 Claims, 11 Drawing Figures

PATENTED FEB 15 1972

INVENTORS
JAY P. CONNIFF
VINCENT N. DELANEY
KENNETH A. MERZ

BY McCormick, Paulding & Huber

ATTORNEYS

FIG. 10
FIG. 11
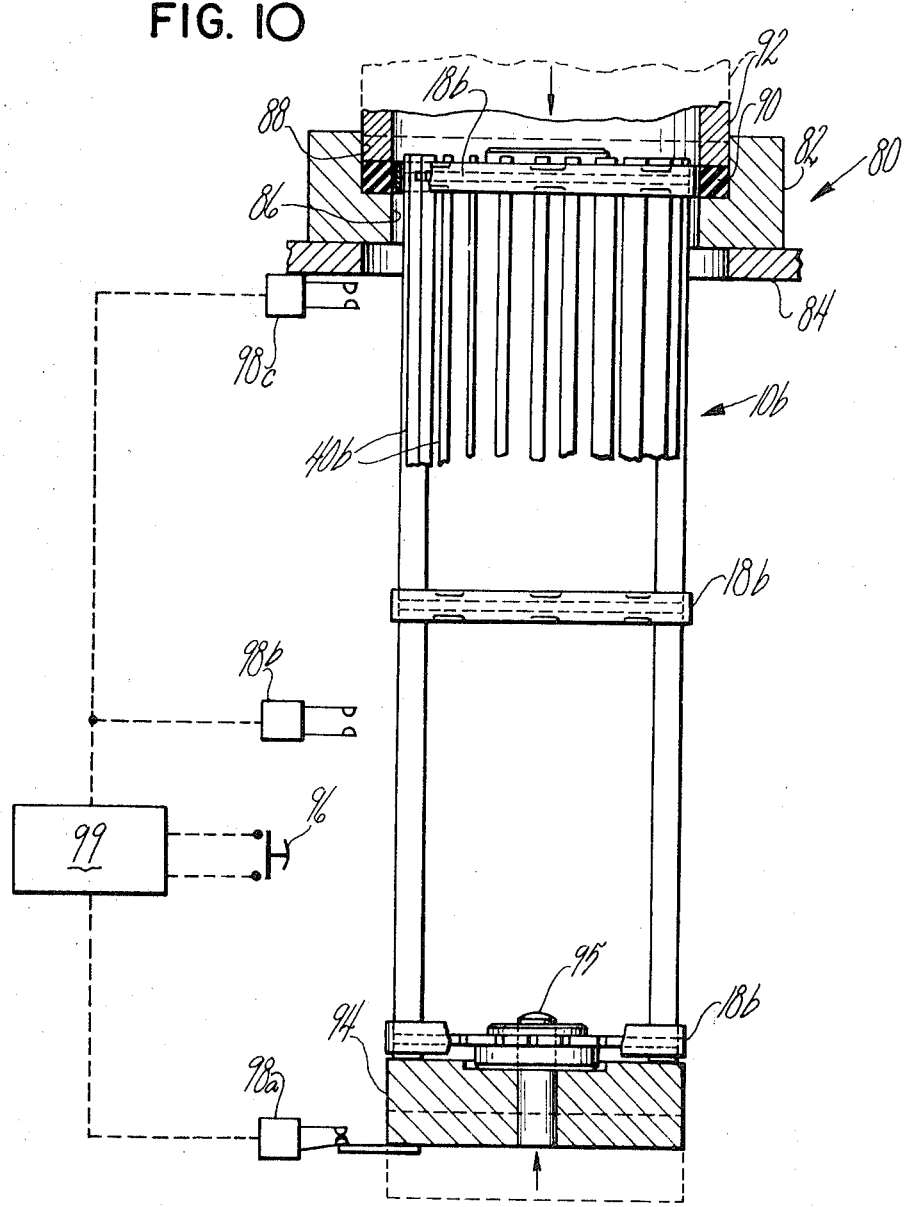
INVENTORS
JAY P. CONNIFF
VINCENT N. DELANEY
KENNETH A. MERZ
BY 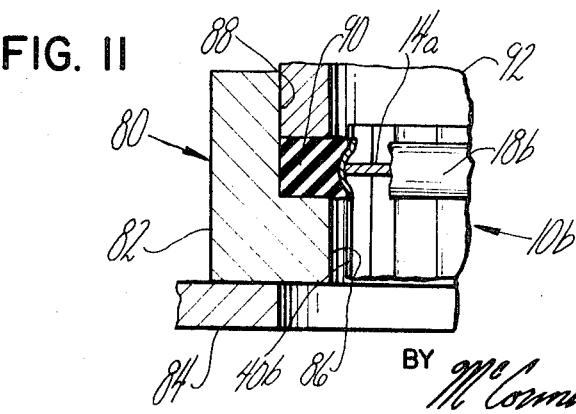
ATTORNEYS

CENTRIFUGAL BLOWER WHEEL METHOD OF MAKING

CROSS REFERENCES TO RELATED APPLICATIONS

This is a continuation-in-part of application Ser. No. 679,112, filed Oct. 30, 1967 now abandoned. Applicant claims right of priority based on Australian application Ser. No. 44,708 filed Oct. 14, 1968.

BACKGROUND OF THE INVENTION

This invention relates to an improved centrifugal blower wheel and to a method of making the same, and it is the general aim of the invention to provide an efficient blower wheel of simple sturdy construction which may be fabricated in time-saving steps to achieve economical high production.

SUMMARY OF THE INVENTION

The principal elements utilized in the construction of a centrifugal blower wheel in accordance with the present invention comprises at least one generally radially disposed support member securing an annular series of fluid-moving blades against displacement in at least one radial direction. At least one relatively thin annular band is positioned adjacent the blades and has displaced interblade portions which retain it in pressure engagement with an exposed axially extending side edge of each blade to secure the blades against movement in an opposite radial direction. All of the interblade portions of the band are preferably simultaneously displaced or deformed by application of a substantially constant deformation force. Various methods may be employed to deform the latter band, however, in accordance with one preferred method for practicing the invention, the band is deformed by energy transferred thereto from a varying magnetic field in a manner as set forth in the U.S. Pat. to Harvey et al., No. 2,976,907, Mar. 28, 1961. In accordance with another method of practicing the invention the deformation force is applied to the band by a resilient deformable annular compression tool.

BRIEF DESCRIPTION OF THE DRAWINGS

FIG. 10 is a somewhat schematic fragmentary sectional view through still another apparatus for assembling a blower wheel in accordance with a further method of the present invention, a partially assembled blower wheel being shown positioned in the apparatus and before the apparatus has operated thereon.

FIG. 11 is a somewhat enlarged fragmentary sectional view of the apparatus and blower wheel of FIG. 10, but shows the apparatus in an operating position.

DESCRIPTION OF THE PREFERRED EMBODIMENTS

Figure 1:
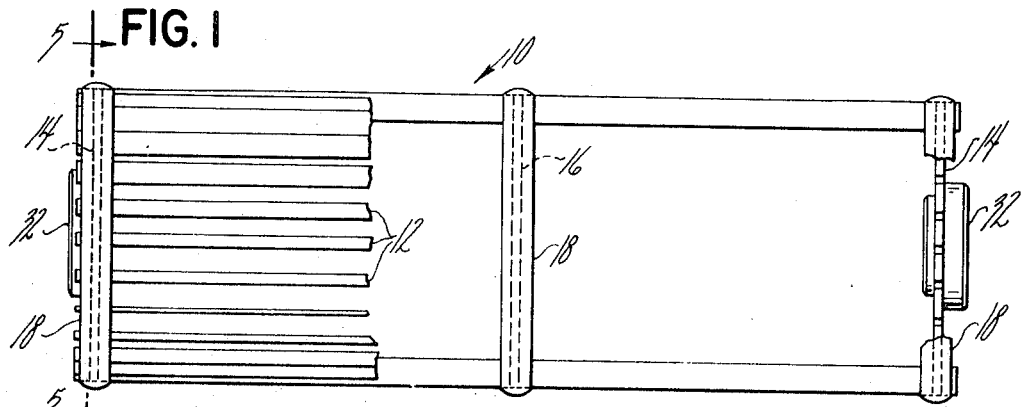
FIG. 1 is a side elevation partially broken away of a centrifugal blower wheel embodying the present invention.
Figure 3:
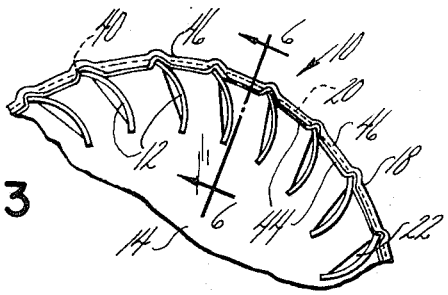
FIG. 3 is a fragmentary end view of the blower wheel of FIG. 1.

Referring now to the drawings and particularly to FIGS. 1 and 3 a centrifugal blower wheel constructed in accordance with the present invention is illustrated and generally designated by the reference numeral 10. The blower wheel 10 is particularly adapted for use in a blower assembly of the so-called transverse flow type and has a circumaxially spaced series of relatively thin axially elongated fluid-moving blades 12, 12 supported by a plurality of substantially identical axially spaced and radially disposed support members or disks 14, 14 and 16. The blades and disks are retained in assembly by a plurality of annular compression bands 18, 18.

Figure 2:
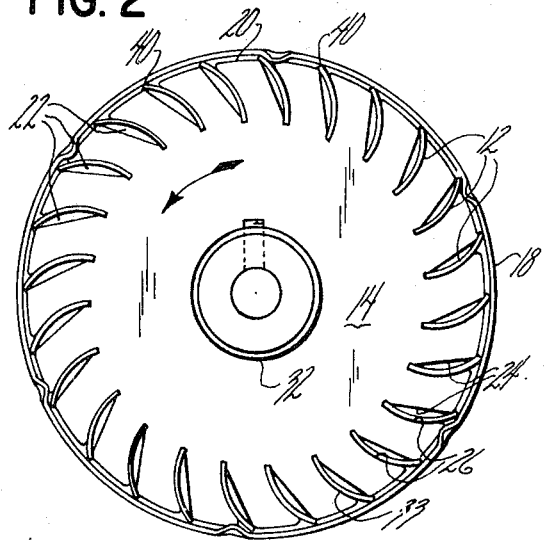
FIG. 2 is an end view of the blower wheel of FIG. 1, but shows the wheel in a partially assembled condition.
Figure 4:
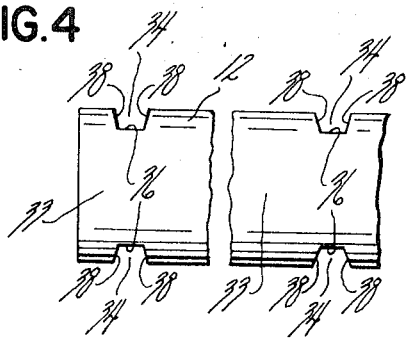
FIG. 4 is a somewhat enlarged fragmentary side elevation of an individual blade.
Figure 5:
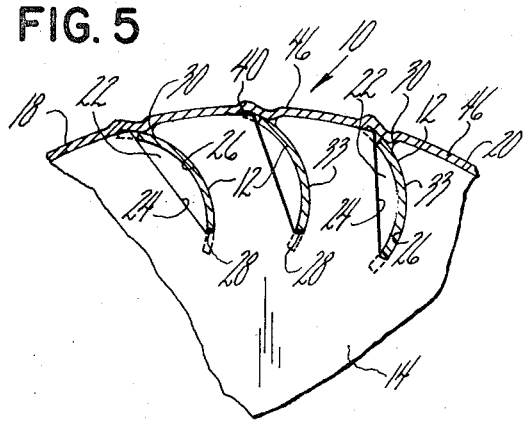
FIG. 5 is a somewhat enlarged fragmentary sectional view taken along the line 5—5 of FIG. 1.

The disks 14, 14 and 16 may be made from various materials and may, for example, be molded from plastic or stamped from metal. Each of the disks has a circular outer edge portion 20 and a circumaxially spaced series of generally radially outwardly opening blade-receiving recesses 22, 22 which secure the blades 12, 12 against displacement in a radially inward direction as best shown in FIG. 5. The shape of the recesses may vary but preferably each recess 22 is generally V-shaped and outwardly inclined from a radial direction and in the direction of rotation which is shown to be counterclockwise as the blower wheel appears in FIG. 2. Each recess 22 has a straight forward edge 24, an arcuate rear edge 26 and an inner edge 28 which extends in a radial direction with respect to the center of curvature of the rear edge. To facilitate insertion of a blade 12 into the recess the junction or corner between the circular edge 20 and the rear edge 26 is slightly rounded as indicated at 30, 30. Each end disk 14 has an attached hub 32 centrally apertured to receive a shaft (not shown) upon which the blower wheel 10 is supported. The center disk 16 is or may be centrally apertured so that a supporting shaft may be inserted axially therethrough.

The blades 12, 12 may also be made from various materials and have any usual or preferred cross-sectional shape since the shape of the effective portion of the blade does not constitute any part of the present invention. Further, the blades are shown as being structurally separate from each other but the invention is not necessarily so limited. Each blade 12 is preferably stamped from relatively thin metal and is generally rectangular having an arcuate cross section and a uniform width throughout its effective length. Each blade 12 further includes a convex rear surface 33 having a radius of curvature generally equal to that of the recess rear edge 26. The blades are preferably arranged to interlockingly engage the disks 14, 14 and 16 in assembly and for this reason each blade has pairs of opposed outwardly opening notches 34, 34 formed in its longitudinally extending edges near both of its ends and proximate its center. Each notch 34 has a longitudinally extending inner edge 36 having a dimension substantially equal to the thickness of an associated supporting disk. To facilitate rapid assembly of the blades with the disks the notch side edges 38, 38 diverge outwardly so that the notch opening is somewhat wider than the associated portion of the disk received therein.

Each blade 12 is received within an associated recess 22 with one notch inner edge 36 generally abutting the recess inner surface 28 and the opposite notch inner surface 36 engaging the recess forward edge 24. In assembly the arcuate recess rear edge 26 engages and complements an associated portion of the blade surface 33. Preferably, the width of each blade 12 is such that an exposed axially extending side edge 40 is spaced radially outwardly beyond the peripheral portion or circular edge 20 of each of the disks.

Each annular band used to complete the assembly is positioned adjacent the blades and has interblade portions which are displaced or deformed so that the band is in pressure engagement with at least an exposed axially extending side edge portion of each blade.

In the presently preferred embodiment of the invention each support member secures the blades against displacement in a radially inwardly direction, and each band surrounds the blades to prevent blade displacement in a radially outwardly direction. However, it should be understood that the invention may be practiced with one or more support members which prevent blade displacement in a radially outwardly direction in which case one or more bands may be provided to prevent displacement in an opposite radial direction.

Figure 6:
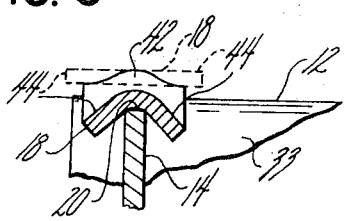
FIG. 6 is a somewhat enlarged sectional view taken along the line 6—6 of FIG. 3.

The bands may have various cross sectional contours and may generally be made of any suitable deformable material, however, in accordance with one preferred method of practicing the invention, hereinafter described, metal bands are employed. In the illustrated embodiment the band 18 is generally cylindrical before assembly and has a width dimension substantially greater than the thickness of the disk 14. Preferably the band is positioned with its central portion 42 generally in the plane of the disk 14 and its marginal edge portions 44, 44 projecting axially outwardly beyond the disk 14 as best shown in FIG. 6, the general position of the band before it is deformed being indicated by broken lines. The size of the band 18 is such that when its interblade portions indicated at 46, 46 are displaced radially inwardly beyond the blade side edges 40, 40 as shown in FIG. 5, the bands surround the blades in pressure engagement with the side edges thereof, thereby retaining the blades in assembly with the disk 14. Preferably the marginal edge portions 44, 44 are also displaced both axially and radially inwardly beyond the disk outer edge 20 so that the band is restrained against axial movement relative to the disk.

Figure 7:
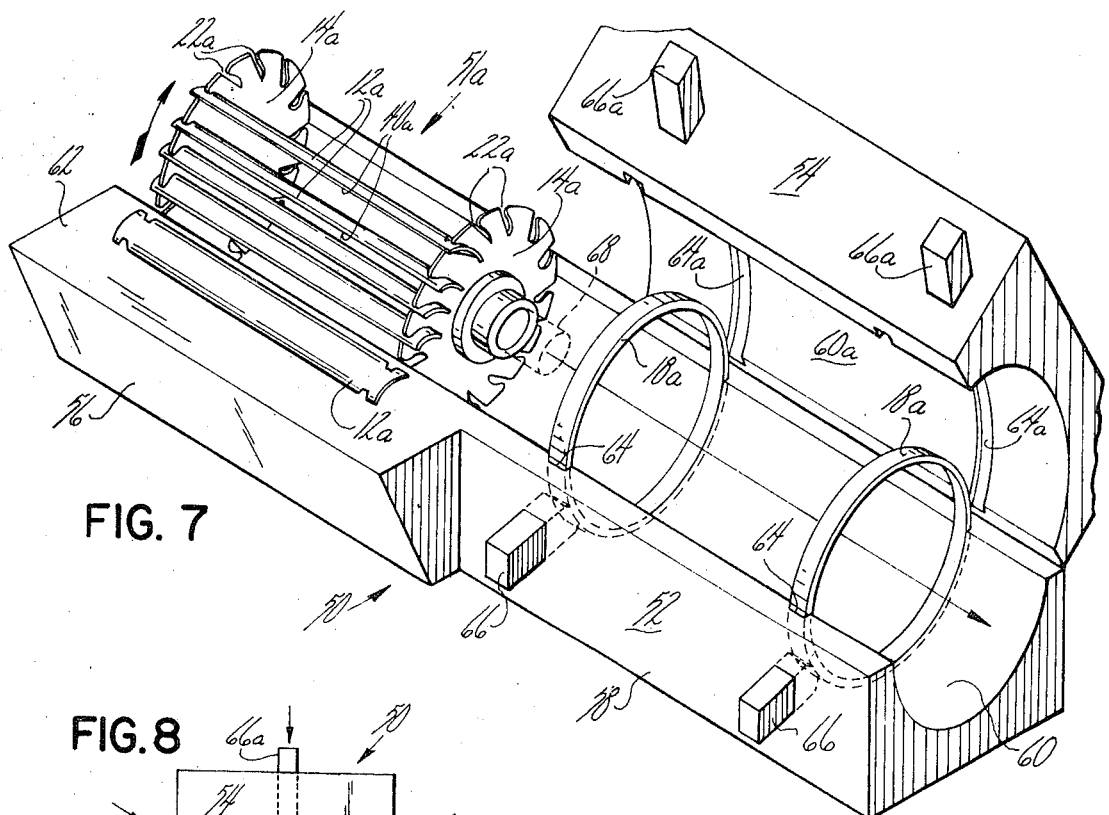
FIG. 7 is a somewhat schematic perspective view of a jig used in making a blower assembly in accordance with the method of the present invention, a partially assembled blower wheel being shown positioned in the jig.
Figure 8:
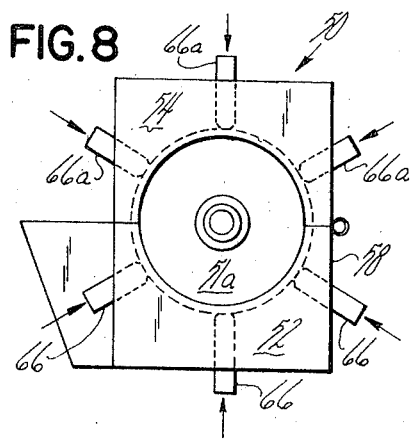
FIG. 8 is an end view of the jig of FIG. 7.
Figure 9:
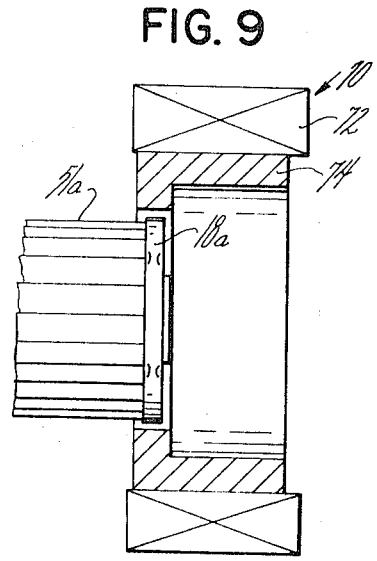
FIG. 9 is a somewhat schematic fragmentary sectional view through an apparatus for assembling a blower wheel in accordance with one method of the present invention, a partially assembled blower wheel being shown in the apparatus before the apparatus has been operated.

In FIGS. 7-9 one method for making a blower wheel in accordance with the present invention is illustrated somewhat schematically. In accordance with this method, a holding fixture such as generally indicated at 50 is provided for supporting various parts of a blower wheel to facilitate assembly thereof. A partially completed blower subassembly indicated generally at 51a and including end disks 14a, 14a and a plurality of blades 12a, 12a generally similar to parts previously described and bearing the same numeral prefix are shown positioned in one section of the holding fixture 50. Two annular compression bands 18a, 18a are also shown supported in a preassembly position in another section of the fixture.

The holding fixture 50 has a lower part 52 and an upper part 54. The troughlike lower part includes contiguous first and second sections of substantially equal length respectively indicated at 56 and 58 and has an elongated upwardly opening generally semicylindrical recess 60 formed therein. An upwardly facing blade-receiving surface 62 extends radially outwardly for some distance from one edge of the recess 60 and two coaxially aligned semicylindrical band-receiving grooves 64, 64 open to the recess 60 in the second section. Each groove 64 has a cross section complementing the cross-sectional configuration of a compression band 18a. The grooves are axially spaced apart a distance equal to the desired axial spacing of the bands on a completed blower wheel assembly. Three equiangularly spaced forming tools 66, 66 are associated with each groove 64 and are supported in the second section 58 for radial movement generally toward and away from the recess 60. Each tool 66 has an inner end for engaging and displacing an associated portion of a band 18a in a desired manner.

The upper part 54 is substantially identical to the lower part second section 58 and includes a semicylindrical recess 60a, two band-receiving recesses 64a, 64a and three similarly arranged forming tools 66a, 66a. The upper and lower parts are preferably hinged or otherwise suitably joined together so that the upper part may be moved between an open position generally illustrated in FIG. 7 and a closed position as it appears in FIG. 8. In the closed position the latter two parts support the bands 18a, 18a and define a generally cylindrical recess for receiving the subassembly 51a and supporting it in proper position relative to the bands to facilitate partial assembly affected by the movement of the forming tools 66, 66 and 66a, 66a.

In accordance with one presently preferred method for practicing the invention with a jig such as aforedescribed, a plurality of disks 14a, 14a are supported in the jig first section 56 in coaxial alignment within the recess 60. The disks may be variously supported in coaxial alignment and axial spaced relation within the jig, but preferably and as shown a pilot shaft such as indicated by broken lines at 68 is provided to temporarily maintain the disks in position to facilitate rapid assembly. The disks 14a, 14a are indexed or intermittently rotated relative to the jig 52 to bring successive blade-receiving notches 22a, 22a into general alignment with the blade-receiving surface 62. Each blade 12a is manually or mechanically fed to the latter surface and inserted into the associated notches 22a, 22a. As the disks 14a, 14a are indexed in a direction generally indicated by the arrow in FIG. 7 it will be noted that the blades 12a, 12a in the upper half section of the subassembly 51 are retained in assembly with the disks by gravity whereas the blades in the lower half section are maintained in assembly by virtue of their position in the recess 60.

After a band 18a has been positioned in each groove 64 the upper part 54 is moved to its closed position as shown in FIG. 8. Thereafter, the subassembly 51a is moved axially of the fixture 52 to a position in the second section 58 whereas the bands 18a, 18a are aligned with the disks 14a, 14a in the preferred generally aforedescribed manner.

To effect partial assembly of the wheel the bands 18a, 18a are crimped or radially inwardly deformed at one or more locations by moving one or more of the tools 66, 66 radially inwardly. The inside diameter of each band is thus reduced to bring the band into light pressure engagement with the blade outer edge portions 40a, 40a. When the fixture is opened the partially assembled blower wheel may be removed therefrom and conveniently handled without risk of the blades being dislodged from their normally assembled positions. Final assembly of the blower wheel is effected by further deforming the compression bands 18a, 18a and preferably all of the interblade portions of these bands are simultaneously displaced both axially and radially inwardly as stated.

In accordance with one preferred method for completing a blower wheel assembly a partially assembled blower wheel is supported with its banded portion within a conductor or solenoid and a predetermined varying magnetic field is set up within the solenoid so that sufficient energy is transferred from the magnetic field to the band to simultaneously displace all of its interblade portions in the desired manner. In FIG. 9 is shown an apparatus for deforming a band in accordance with this preferred method. The apparatus indicated generally at 70 includes a compression coil 72 having a generally cylindrical shape and a conductive metal structure or field shaper 74 adapted to coaxially receive and closely surround the band 18a of a partially assembled blower wheel 51a to localize the energy from the magnetic field and apply most of the available energy to the band.

When an electrical current pulse is supplied to the solenoid 72 a varying magnetic field is set up which induces an electromotive force in the band 18a which, in turn, causes a high current to flow around it. Sufficient energy may be transformed to the band by the interaction of the induced current and the magnetic field to force the tubular wall portion of the band inwardly at all of its interblade portions. The resulting deformation force is substantially constant throughout the deformation cycle and all interblade portions of the band are displaced both axially and radially inwardly as previously described. While the apparatus illustrated in FIG. 9 is particularly adapted to deform interblade portions of a band such as 18a axially and radially inwardly it should be understood that other arrangements employing like apparatus are possible, as for example to effect axially and radially outwardly displacement of a band and such arrangement are contemplated within the scope of the present invention. For a further discussion of this method for deforming a cylindrical electrically conductive part reference may be had to the aforeidentified patent to Harvey et al.

In accordance with still another method for completing a blower assembly as aforedescribed, a resilient deformable annular compression tool is employed to simultaneously deform or displace all of the interblade portions of an annular compression band which comprises a part of the assembly. The tool is positioned generally adjacent a peripheral surface of the band and restrained against radial deformation in a direction opposite to the direction of desired band displacement. Compressive force is then applied to the tool in an axial direction to deform it in the desired radial direction to bring it into pressure engagement with the adjacent peripheral surface of the band whereby to effect the desired displacement of the band interblade portions.

Referring now to FIGS. 11 and 12, an apparatus embodying an annular compression tool such as aforedescribed is illustrated and designated generally by the reference numeral 80. A blower wheel positioned in the apparatus 80 and indicated generally at 10b is shown in a partially assembled condition in FIG. 11 and in a fully assembled condition in FIG. 12. Parts of the blower wheel 10b substantially identical to parts of the wheel 10 previously described bear the same reference numeral and a letter suffix b and will not be hereinafter further described.

The apparatus 80 comprises a tool holder 82 which is supported on a horizontally disposed frame 84 and has a generally cylindrical upwardly opening bore 86 therethrough. The diameter of the bore 86 is somewhat larger than the outside diameter of the bands 18b, 18b before assembly so that the bands may be freely positioned in the bore. At its upper end the bore 86 has an enlarged cylindrical portion 88 which receives a resilient annular tool or compression ring 90 therein. The ring 90 is preferably made from an elastomeric material, such as rubber, which may be readily deformed by application of compressive force without undergoing a substantially change in volume. It has an outside diameter substantially equal to the diameter of the bore portion 88. The inside diameter of the ring 90 in its undeformed condition is slightly larger than the outside diameter of the bands 18b, 18b before assembly.

Compressive force is applied to the ring 90 by an axially movable hollow cylindrical compression member or ram 92 which has an outside diameter substantially equal to the diameter of the bore portion 88 and an inside diameter substantially equal to the inside diameter of the ring 90 in its undeformed condition, as it appears in FIG. 11. The ram 92 is received in the bore portion 88 and bears against the upper surface of the ring 90. Means, which may, for example, comprise an hydraulic mechanism (not shown) is provided for moving the ram 92 in an axial direction generally toward and away from the ring 90.

The apparatus 80 also includes a vertically movable positioner 94 for supporting the blower wheel 10b in the apparatus with its uppermost band 18b in proper orientation with the ring 90 and for sequentially positioning the other bands 18b, 18b with respect to the ring. The positioner 94 includes an axially upward projecting pin 95 adapted to be received in the hub 32b at the lower end of the blower wheel 10b to coaxially align the wheel with the ring 90. Positioning controls are provided, which may, for example, comprise switches such as indicated at 98a, 98b and 98c in the path of the positioner 94 and conventional associated cycle timers or like devices in a control circuit 99 for actuating the ram cycle to move the ram 92 into compressive engagement with the ring 90 as each successive band 18b is positioned in the ring.

At the beginning of the cycle, the positioner 94 is in its lowered or broken-line position as it appears in FIG. 10 to receive a partially assembled blower wheel 10b. Operation of the switch 96 causes the positioner 94 to move upwardly from its broken to its full line position of FIG. 10 and into contact with the switch 98a at which point the ram or deformation cycle begins. As the ram 92 descends, the compression ring 90, which is restrained against deformation in a radially outwardly direction by the bore portion 88, is deformed radially inwardly by the ram and into pressure engagement with the peripheral surface of an associated band 18b positioned therein so that all of the interblade portions of the band are simultaneously deformed or displaced radially inwardly beyond the exposed blade edges 40b, 40b. The marginal edge portions 44b, 44b are or may also be displaced both axially and radially inwardly beyond the disk outer edge 20b.

After the uppermost band 18b has been deformed the ram 92 ascends and the ring 90 returns to its undeformed condition. The control circuit 99 then causes the positioner 94 to move upwardly to bring the central ring 18b into coaxial alignment with the tool 90 at which point the positioner 94 engages the switch 98b to initiate the next ram cycle. Since the blower wheel 10b is provided with three bands 18b, 18b to be deformed, the apparatus 80 has three cycle control switches 98a, 98b and 98c. The number and relative arrangement of the control switches will, of course, depend upon the number and arrangement of the bands on the blower wheel to be assembled.

We claim:

1. A method for making a centrifugal blower wheel comprising the steps of providing a rotatable support member having a circumaxially spaced series of blade-holding means for securing blades against displacement in at least one radial direction, providing a plurality of blades equal in number to said blade-holding means and each having a generally axially disposed portion including a radially exposed side edge, engaging said axially disposed portion of each of the said blades with an associated one of the said blade-holding means with said side edge exposed in a direction generally opposite to said one radial direction, positioning an annular member adjacent an exposed side edge of each of said blades, and simultaneously applying a generally radially directed force to the entire peripheral surface of said member on an opposite side thereof from said exposed side edge and in a direction opposite said one radial direction to simultaneously deform radially the interblade portions of said member to bring said member into pressure engagement with each said side edge.

2. A method for making a centrifugal blower wheel comprising the steps of providing a rotatable support member having a circumaxially spaced series of blade-holding means for securing blades against displacement in at least one radial direction, providing a plurality of blades equal in number to said blade-holding means and each having a generally axially disposed portion including a radially exposed side edge, engaging said axially disposed portion of each of the said blades with an associated one of the said blade-holding means with said side edge exposed in a direction generally opposite to said one radial direction, positioning an annular member adjacent an exposed side edge of each of said blades, and applying substantially constant radially directed force to the peripheral surface of said member on an opposite side thereof from said exposed side edge and in a direction opposite said one radial direction to deform radially the interblade portions of said member to bring said member into pressure engagement with each said side edge.

3. A method for making a centrifugal blower wheel comprising the steps of providing a rotatable support member having a circumaxially spaced series of blade-holding means for securing blades against displacement in at least one radial direction, providing a plurality of blades equal in number to said blade-holding means and each having a generally axially disposed portion including a radially exposed generally axially extending side edge, engaging said axially disposed portion of each of the said blades with an associated one of the said blade-holding means with said side edge exposed in a direction generally opposite to said one radial direction, positioning an annular member adjacent an exposed side edge of each of said blades, and deforming the interblade portions of said annular member in a radial direction generally opposite said one radial direction and beyond said exposed blade side edge to bring said member into pressure engagement with each said side edge.

4. A method for making a blower wheel as set forth in claim 1 wherein the step of simultaneously applying a generally radially directed force to said entire peripheral surface to simultaneously deform radially said interblade portions is further characterized as simultaneously applying said generally radially directed force to displace said interblade portions of said member radially beyond said exposed side edges and in a direction opposite said one direction to bring said member into pressure engagement with each said side edge whereby to hold the blades and support member in assembly.

5. A method for making a centrifugal blower wheel comprising the steps of providing a rotatable support member having a circumaxially spaced series of blade-holding means for securing blades against displacement in at least one radial direction, providing a plurality of blades equal in number to said blade-holding means and each having a generally axially disposed portion including a radially exposed side edge, engaging said axially disposed portion of each of the said blades with an associated one of the said blade-holding means with said side edge exposed in a direction generally opposite to said one radial direction, positioning an annular member adjacent an exposed side edge of each of said blades, crimping at least one interblade portion of said member to bring said member into relatively light pressure engagement with the exposed side edge portions of said blades, and simultaneously applying force to the entire peripheral surface of said member on an opposite side thereof from said exposed side edge and in a direction opposite said one radial direction to simultaneously deform the interblade portions of said member to bring said member into pressure engagement with each said side edge.

6. A method for making a centrifugal blower wheel comprising the steps of providing a rotatable support member having a circumaxially spaced series of blade-holding means for securing blades against displacement in at least one radial direction, providing a plurality of blades equal in number to said blade-holding means and each having a generally axially disposed portion including a radially exposed side edge, engaging said axially disposed portion of each of the said blades with an associated one of the said blade-holding means with said side edge exposed in a direction generally opposite to said one radial direction, positioning an annular member made from metal adjacent an exposed side edge of each of said blades, setting up a predetermined varying magnetic field, and maintaining said member within the magnetic field so that sufficient magnetic force is transferred from the magnetic field to the entire peripheral surface of said member on the opposite side thereof from said exposed side edge and in a direction opposite said one radial direction to simultaneously deform the interblade portions of said member to bring said member into pressure engagement with each said side edge.

7. A method for making a centrifugal blower wheel comprising the steps of providing a rotatable support member having a circumaxially spaced series of blade-holding means for securing blades against displacement in at least one radial direction, providing a plurality of blades equal in number to said blade-holding means and each having a generally axially disposed portion including a radially exposed side edge, engaging said axially disposed portion of each of the said blades with an associated one of the said blade-holding means with said side edge exposed in a direction generally opposite to said one radial direction, positioning an annular member adjacent an exposed side edge of each of said blades, providing a compression apparatus for simultaneously applying force to the entire peripheral surface of said member on an opposite side thereof from said exposed side edge and in a direction opposite said one radial direction, said apparatus including a resilient deformable annular compression tool for effecting pressure engagement with said peripheral surface and means for restraining said tool against deformation in said one radial direction, positioning said tool generally adjacent said peripheral surface, and applying compression force to said tool in a generally axial direction to deform said tool in a direction generally opposite said one radial direction and bring said tool into pressure engagement with said peripheral surface to simultaneously deform the interblade portion of said member to bring said member into pressure engagement with each said side edge.

8. A method for making a centrifugal blower wheel comprising the steps of providing a radially disposed support member having a circular outer edge portion and including a circumaxially spaced series of blade-receiving notches for securing blades against displacement in a radially inwardly direction, each of said notches opening outwardly through said circular edge portion, providing a plurality of blades equal in number to said notches and each having a generally axially disposed portion including a radially exposed generally axially extending side edge, engaging said axially disposed portion of each of said blades with an associated one of said notches with said side edge exposed in a radially outwardly direction, positioning an annular member adjacent an exposed side edge of each of said blades to surround said circular outer edge portion with the marginal edges of said annular member projecting axially outwardly in opposite directions beyond said circular edge portion, and displacing the interblade portions of said annular member radially inwardly beyond said circular edge to bring said annular member into pressure engagement with each said side edge.

* * * * *